(12) United States Patent
Young et al.

(10) Patent No.: US 8,540,259 B1
(45) Date of Patent: Sep. 24, 2013

(54) CONSTRUCTION METHOD TO CONTROL FRONT ENGINE COMPARTMENT DEFORMATION

(75) Inventors: Jonathan Richard Young, Dundee, MI (US); Taichi Yamashita, Northville, MI (US); Jesse Thomas Buehler, Ypsilanti, MI (US); Gerritt Benjamin Meyers, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/445,145

(22) Filed: Apr. 12, 2012

(51) Int. Cl.
*B62D 21/15* (2006.01)

(52) U.S. Cl.
USPC .................................. 280/124.109

(58) Field of Classification Search
USPC .......... 280/124.109, 781, 784, 785; 180/311, 180/312
See application file for complete search history.

(56) References Cited

U.S. PATENT DOCUMENTS

| | | |
|---|---|---|
| 3,774,712 A | 11/1973 | Froumajou |
| 3,881,742 A | 5/1975 | Felzer |
| 4,058,182 A | 11/1977 | Huber |
| 4,440,435 A | 4/1984 | Norlin |
| 5,476,151 A | 12/1995 | Tsuchida et al. |
| 5,555,950 A | 9/1996 | Harada et al. |
| 6,367,869 B1 | 4/2002 | Baccouche et al. |
| 6,402,229 B1 | 6/2002 | Suganuma |
| 6,601,873 B1 | 8/2003 | Bartesch et al. |
| 6,827,168 B2 | 12/2004 | Miyazaki |
| 6,843,524 B2 | 1/2005 | Kitagawa |
| 6,923,474 B2 * | 8/2005 | Frasch et al. .................. 280/784 |
| 7,229,099 B2 | 6/2007 | Reim et al. |
| 7,393,016 B2 | 7/2008 | Mitsui et al. |

(Continued)

FOREIGN PATENT DOCUMENTS

| | | |
|---|---|---|
| EP | 0921051 B1 | 5/2002 |
| JP | 11171046 A | 6/1999 |
| JP | 2000038159 A | 2/2000 |
| JP | 2000085616 A | 3/2000 |
| JP | 2000289651 A | 10/2000 |
| JP | 2006088871 | 4/2006 |

OTHER PUBLICATIONS

Corresponding Utility U.S. Appl. No. 13/445,138 for Electric Vehicle Construction Methods for Frontal Impact filed on Apr. 12, 2012.

(Continued)

*Primary Examiner* — Faye M. Fleming
(74) *Attorney, Agent, or Firm* — Christopher G. Darrow; Young Basile Hanlon & MacFarlane, P.C.

(57) ABSTRACT

A frame structure absorbs energy from frontal impacts and extends under a front portion of the body frame. The frame structure includes a rear sub-frame located below and in front of a pair of side frame under-members, and an inverter protection brace extending between the front sub-frame and the rear sub-frame. Loading from the inverter protection brace travels through the rear sub-frame to A-point bolt connections located on the pair of front frame side members. The rear sub-frame moves rearward and deforms at the A-point bolt connections. The load through the A-point bolt connections changes the deformation mode of the frame front side members between the A-point bolt connections and B-point bolt connections. At least one of the pair of side frame under-members buckles rearward of the B-point bolt connection located on the pair of side frame under-members for energy absorption during the frontal impact.

26 Claims, 10 Drawing Sheets

(56) References Cited

U.S. PATENT DOCUMENTS

| | | |
|---|---|---|
| 7,703,805 B2 | 4/2010 | Sasaki et al. |
| 7,802,643 B2 | 9/2010 | Yajima |
| 7,832,748 B2 * | 11/2010 | Cariou et al. .......... 280/124.109 |
| 7,883,113 B2 | 2/2011 | Yatsuda |
| 7,886,861 B2 | 2/2011 | Nozaki et al. |
| 7,921,951 B2 | 4/2011 | Watanabe et al. |
| 7,997,377 B2 | 8/2011 | Kim et al. |
| 8,037,960 B2 | 10/2011 | Kiya |
| 2006/0157292 A1 * | 7/2006 | Miyagawa et al. ........... 180/312 |
| 2011/0114402 A1 | 5/2011 | Inoue et al. |
| 2011/0120787 A1 | 5/2011 | Lee et al. |
| 2011/0132676 A1 | 6/2011 | Kodaira |
| 2011/0162902 A1 | 7/2011 | Dobbins et al. |
| 2011/0241385 A1 | 10/2011 | Bacciouche et al. |

OTHER PUBLICATIONS

Corresponding Utility U.S. Appl. No. 13/445,147 for Sub-frame Intrusion Control by Ramping During Frontal Impact for Electric Vehicle Battery filed on Apr. 12, 2012.

Corresponding Utility U.S. Appl. No. 13/445,169 for Electric Vehicle Control Methods for Frontal Impact Utilizing Deformation Shape Control filed on Apr. 12, 2012.

Corresponding Utility U.S. Appl. No. 13/445,176 for Subframe Intrusion Control by Steering Gear Catcher filed on Apr. 12, 2012.

Corresponding Utility U.S. Appl. No. 13/445,191 for Tether Approach to Control Underbody Energy Absorption Interaction with Subframe filed on Apr. 12, 2012.

* cited by examiner

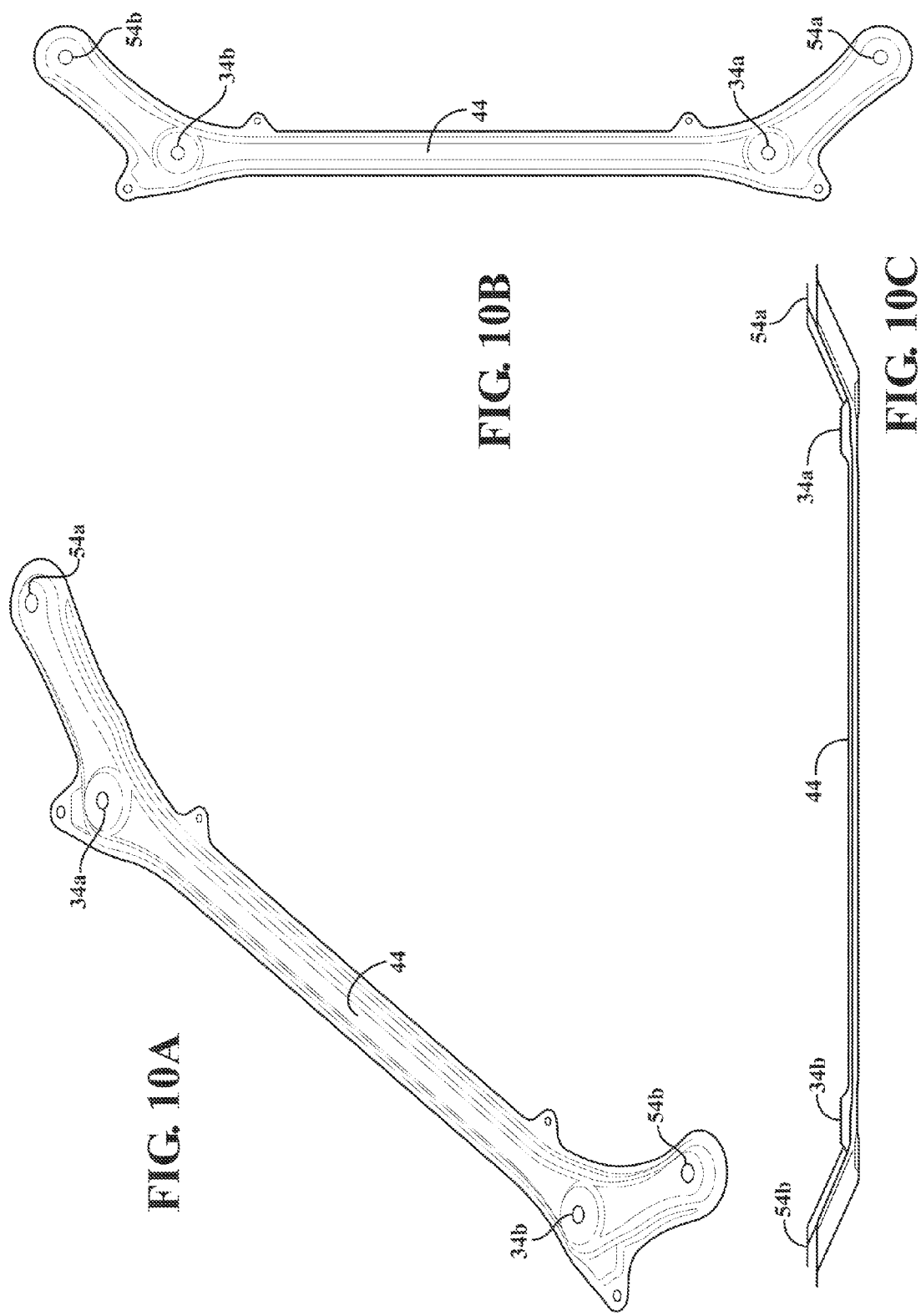

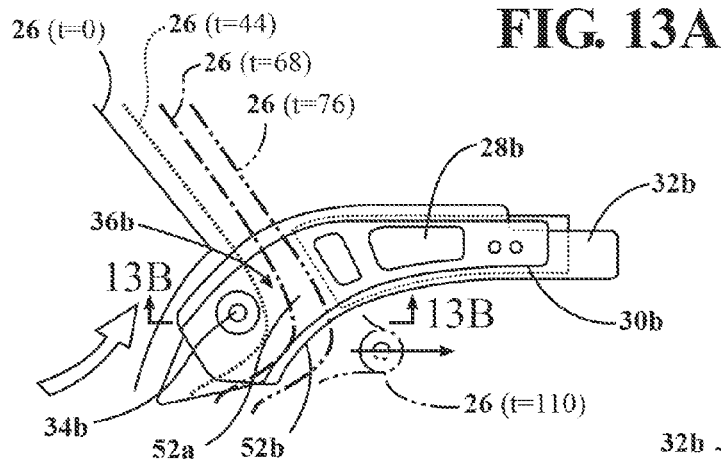
FIG. 13A
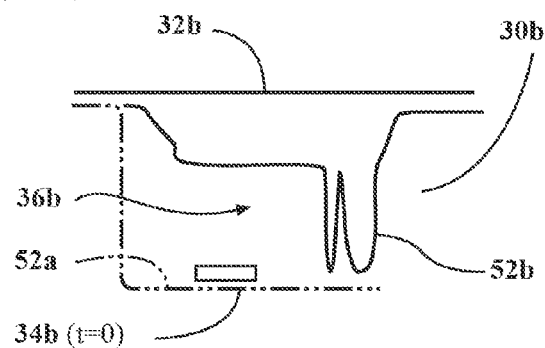
FIG. 13B
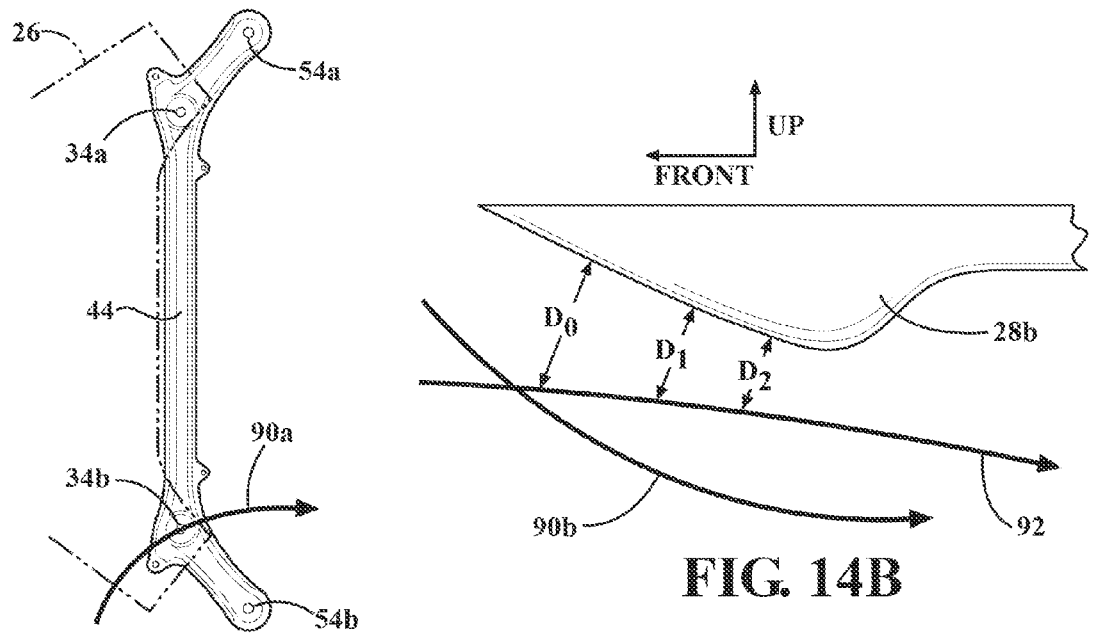
FIG. 14A
FIG. 14B

CONSTRUCTION METHOD TO CONTROL FRONT ENGINE COMPARTMENT DEFORMATION

CROSS-REFERENCE TO RELATED APPLICATIONS

This application is related by common subject matter to U.S. patent application Ser. No. 13/445,138; Ser. No. 13/445,157; Ser. No. 13/445,169; Ser. No. 13/445,176; and Ser. No. 13/445,191, all filed on Apr. 12, 2012, which are incorporated by reference herein in their entirety.

FIELD OF THE INVENTION

The invention relates to a land vehicle having supporting wheels to engage a surface over which the vehicle moves, a motor or hybrid electric engine enabling the vehicle to be moved along the surface, a frame providing support for a vehicle body, where at least a portion of the frame permanently changes shape or dimension in response to impact of the frame with another body, and more particularly to a body frame for an electric vehicle having structural members adapted to absorb energy from frontal impacts which extend under a front portion of the body frame, including structure for retarding motion by positive engagement of elements, where relatively at least one member is adapted to be deformed beyond its elastic limit to restrain relative motion.

BACKGROUND

During frontal impacts defined in Insurance Institute for Highway Safety (MIS) and Federal Motor Vehicle Safety Standard (FMVSS) protocols, front structural members deform into the engine/motor compartment and body cabin. In these areas, electric or hybrid electric vehicles will have high voltage (HV) components (e.g. an inverter in the motor compartment and a battery under the body cabin, DC-DC converter, charger). These parts may be positioned in a traditional crush zone and/or a new crush zone presented by the removal of the much larger internal combustion engine and supporting structures.

High voltage (HV) inverters are typically protected by a thick case to resist any crushing force or packaged outside of the expected crush zone. High voltage (HV) batteries are typically packaged outside of traditional crush zones to avoid deformation of battery arrays. Removal of traditional load paths result in increased body cabin deformation unless appropriate alternative structures are added.

The large mass for an inverter case is counter-productive for a long range electric vehicle (EV). Thus a more mass effective option is needed. Battery arrays packaged outside of a crush zone are typically smaller and thus limit drivable range for the vehicles. Overall, all high voltage (HV) components must be protected from damage during crash impacts while maximizing drivable range through larger batteries and low mass protection structures.

SUMMARY

A frame structure for a land vehicle has wheels to engage a surface over which the vehicle moves. An electric motor enables the vehicle to be moved along the surface. The frame structure provides support for a vehicle body. At least a portion of the frame structure permanently changes shape in response to impact of the frame structure with another body. The frame structure is adapted to absorb energy from frontal impacts. The frame structure extends under a front portion of the body frame. The frame structure includes a front sub-frame and a rear sub-frame located below and in front of a pair of side frame under-members, and an inverter protection brace extending between the front sub-frame and the rear sub-frame for transferring energy from the front sub-frame to the rear sub-frame during a frontal impact.

A method is disclosed of assembling structural members for absorbing energy from frontal impacts of a frame structure. The frame structure permanently changes shape in response to impact of the frame structure with another body. The frame structure extends under a front portion of the body frame. The method includes locating a front sub-frame and a rear sub-frame below and in front of a pair of side frame under-members, and connecting an inverter protection brace extending between the front sub-frame and the rear sub-frame for transferring energy during a frontal impact.

A frame structure is adapted to absorb energy from frontal impacts. The frame structure extends under a front portion of the body frame. The frame structure includes a rear sub-frame located below and in front of a pair of side frame under-members, and an inverter protection brace extending between the front sub-frame and the rear sub-frame for transferring energy from the front sub-frame to the rear sub-frame during a frontal impact.

Loading from the inverter protection brace can travel through the rear sub-frame to an A-point bolt connection located on a pair of front frame side members. The rear sub-frame moves rearward and deforms at the A-point bolt connections. The load through the A-point changes the deformation mode of the frame front side members between the A-point and the B-point bolt connections. At least one of a pair of side frame under-members buckles rearward of the B-point bolt connection to the pair of side frame under-members for energy absorption during the frontal impact. The inverter protection brace can deform adjacent a bolted connection at a rear end to form a safety cage around an inverter during the frontal impact. A gusset connecting a front of the inverter protection brace to the front sub-frame can rotate below the front sub-frame to delay loading of the inverter protection brace and to delay bending of the front frame side members to improve energy absorption of the front frame side members during frontal impacts.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 10A is a perspective view of a top of the tether;

FIG. 10B is a bottom view of the tether of FIG. 10A;

FIG. 10C is a side view of the tether of FIGS. 10A-10B;

FIG. 13A is a detailed view of a side frame under-member, reinforcement bracket, and B-point attachment location, where movement of the rear sub-frame is shown in various time segments corresponding to FIGS. 11A-11E (i.e. t=0 ms; t=44 ms; t=68 ms; t=76 ms; t=100 ms) during energy absorption pocket formation;

FIG. 13B is a cross sectional view of the side frame under-member, reinforcement bracket, and B-point attachment taken as shown in FIG. 13A;

FIG. 14A is a simplified schematic of a tether and rear sub-frame, where a rotational arrow is shown for the tether in response to rearward movement of the rear sub-frame; and FIG. 14B is a simplified schematic of a ramp, rear sub-frame and a rotational arrow for the tether in response to rearward movement of the rear sub-frame, where a combined rotational path defines a progressively narrowing gap between the rear sub-frame and ramp, such that $D_0 > D_1 > D_2$, increasing crushing contact and friction.

DETAILED DESCRIPTION

Figure 1:
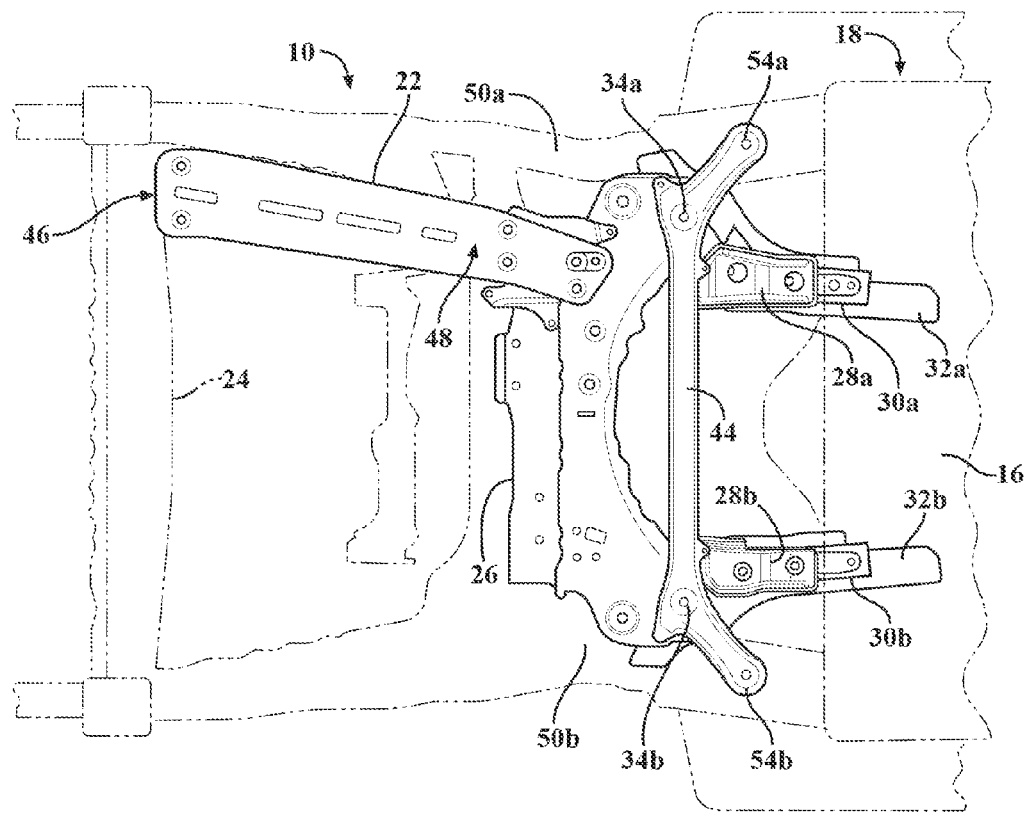
FIG. 1 is a bottom view of a front end of a vehicle having front and rear sub-frames and a pair of side frame under-members, an inverter protection brace extends between the front and rear sub-frames, reinforcement brackets are attached to the pair of side frame under-members, ramps are connected to the reinforcement brackets, and a tether is connected between the pair of side frame under-members and the rear sub-frame.

The purpose of the construction method and the vehicle frame structure 10 is to protect the high voltage (HV) inverter 12 in the motor compartment 14 and the HV battery array (battery) 16 under the body cabin 18 from deformation and damage during a frontal impact event. In addition, the body deformation is controlled such that the body cabin 18 maintains suitable clearance for occupants. The construction method and frame structure 10 will allow the high voltage (HV) inverter 12 to be protected by a safety cage 20. The previously know safety cage was typically large mass or approximately ten kilograms (kg), where are the safety cage of the disclosed frame structure 10 may be only five kilograms (kg). The inverter 12 can be placed in traditional frontal impact crush zones with the disclosed construction method. The battery 16 is able to be packaged in a traditional crush zone by deflecting the path of intruding structures beneath the battery and by improving the energy absorbing characteristics of the deforming system in this area. By controlling body cabin 18 deformation, by maintaining energy absorption (EA), and by adding new load paths, the standard of safety for electric or hybrid-electric vehicles (Federal Motor Vehicle Safety Standards (FMVSS) and Insurance Institute for Highway Safety (MS) tests) is maintained to a similar level as traditional internal combustion (IC) engines.

Development of the frame structure system revolved around five concerns to be addressed. First, the high voltage (HV) inverter 12 is packaged in a traditional crush zone. To protect the high voltage inverter 12, a safety cage 20 needs to be established around the location of the inverter 12. An inverter protection brace 22 can be added to connect a front support structure (sub-frame) 24 to a rear sub-frame 26. The rear sub-frame 26 attaches at A-point bolt connections 56a, 56b and B-point bolt connections 34a, 34b. The inverter protection brace load through the A-point bolt connections 56a, 56b changes the deformation mode of the front frame side members between the A-point bolt connections 56a, 56b and the B-point bolt connections 56a, 56b. Loading from the inverter protection brace 22 travels through the rear sub-frame 26 to the A-point bolt connections 56a, 56b located on a pair of front frame side members 50a, 50b resulting in earlier front frame side member deformation. Protection space is secured with the inverter protection brace 22, but as a result of the inverter protection brace direct loading of the barrier wall and additional deformation of the front frame side members the rear sub-frame 26 rearward displacement is increased. Second, the increase in rear sub-frame 26 rearward displacement results in intrusion into a support tray for the battery 16. The trajectory of the rear sub-frame 26 can be changed by adding body and/or sub-frame ramps 28a, 28b. The initial concept succeeds in lowering a path of the rear sub-frame 26 below the modules of the battery 16, but effectively removes a load path through the battery support from the frontal impact structure resulting in increased body cabin 18 deformation. Third, deflection of the rear sub-frame 26 below the battery 16 removes that load path (and in conjunction with removal of the traditional internal combustion (IC) engine) results in additional body cabin 18 deformation from the loss of that EA member. A reinforcement bracket 30a, 30b can be added to the side frame under members 32a, 32b behind a B-point connections 34a, 34b with enough clearance to facilitate formation of a pocket 36a, 36b to form during rear sub-frame 26 rearward motion. In conjunction with the front frame side member deformation between the A and B point connections the rear sub-frame 26 deforms at the A-point bolt connections 56a, 56b and at least one of the pair of side frame under-members 32a, 32b buckles rearward of the B-point bolt connections 34a, 34b for energy absorption during frontal impacts. A pocket 36a, 36b is formed, reinforced by added bracket, in the side frame under-members 32a, 32b creating good energy absorption (EA) and the resulting temporary lockup with reinforcement brackets 30a, 30b deforms the side frame under-members 32a, 32b rearward. Eventually, the pocket 36a, 36b breaks, releasing the B-point; attachment bolt connections 34a, 34b and sliding movement of the rear sub-frame 26 relative to the side frame under-members 32a, 32b begins. Further improvement can be provided at the point where energy absorption (EA) drops corresponding to the beginning of rearward sliding movement of the rear sub-frame 26. Fourth, when the rear side of the pockets 36a, 36b breaks a force drop occurs corresponding to free rear sub-frame 26 slide. In order to limit the drop in EA from free rear sub-frame 26 slide a catch and engage system can be provided. A front edge or catching surface 38 of the ramp 28a can be aligned with a steering gear 40 and B-point bolt connection 34a. The front edge 38 of the ramp 28a can be changed to act as a stopper or catcher for the steering gear 40. The steering gear 40 loads the ramp 28a directly and then the side frame under-member 32a welds begin to separate rearward to mitigate force levels. The locked together rear sub-frame 26 and catching feature surface 40 move rearward in tandem with under-member weld separation. This improves the energy absorption (EA) condition until the rear sub-frame 26 slips-off. Fifth, it would be desirable to prevent early rear sub-frame 26 slip-off of the ramps 28a, 28b and the side frame under-members 32a, 32b. A tether 44 can be added by modification of a noise-vibration (NV) and ride & handling brace to support the rear sub-frame 26 upward into energy absorption (EA) structures during a rearward stroke. The rear sub-frame 26 slip can be delayed until almost all energy from a frontal impact is absorbed. The rear sub-frame 26 locus is still beneath battery 16. The frame structure can be generally defined in the field as either a uni-body construction where the frame members provide support for a body cabin welded to the frame, a body-on-frame design where the cabin is fastened to the frame structure, or other variants (such as monocoche structures).

The frame structure system has five components which can be used individually or in any combination. First, the inverter protection brace 22 can be connected to the front sub-frame 24 and the rear sub-frame 26, which protects the inverter 12 by establishing the strong safety cage 20. Second, the addition of the body ramps 28a, 28b deflect the rear sub-frame 26 path beneath the battery 16, but increases the rear sub-frame 26 motion (from increased mass, and/or removal of the traditional internal combustion (IC) engine load path, and/or increased input load from motor mount or brace structure) because no load is applied to a frame of the battery 16 and the effect of ramping reduces the natural tendency for rear sub-frame to body interference. Third, the reinforcement brackets 30a, 30b can be added on the vehicle side frame under-members 32a, 32b positioned rearward of the rear sub-frame 26 attachment point. The rear sub-frame 26 is driven rearward against the side frame under-members 32a, 32b deforming the side frame under-member members 32a, 32b and creating the pocket 36a, 36b of shape which is defined by the position of the reinforcement bracket which absorbs energy and slows the vehicle. After the rear sub-frame 26 fully deforms the pockets 36a, 36b, the pocket 36a, 36b and tears the rear sub-frame 26 is released. Fourth, the catching surface 38 can be added on the ramps 28a, 28b to allow catching of the steering gear 40, which is mounted on the top surface of the rear sub-frame 26. The catching of the steering gear 40 in conjunction with the pockets 36a, 36b allows more energy absorption to occur as the side frame under-members 32a, 32b welding begins to separate from the vehicle as the locked structure moves rearward. The rear sub-frame 26 slips at a later timing than without this catching surface 38. Fifth, body noise-vibration (NV) and ride-and-handling braces can be modified to act as the sub-frame tether 44. This tether 44 is able to control the rear sub-frame 26 motion such that additional crush is required to advance the rear sub-frame 26 rearward. The tether 44 separates after most of the energy is removed from the system. In some cases it may be beneficial to keep the tether 44 attached to prevent release of free parts from the vehicle during a crash.

Referring now to FIGS. 1, 9A-9B and 11A-11E, the inverter protection brace 22 connects the front sub-frame 24 to the rear sub-frame 26 by bolt-on connections at a front end and a rear end. The motor, which is attached to the rear sub-frame 26, rotates out of the path of the intruding side member taking the inverter 12 with the motor. The inverter protection brace 22 has a gusset 46 at the front end connected to the front sub-frame 24 to load a beam section without overloading attachment bolts. The gusset 46 is connected to the front sub-frame 24 at a location outboard from a centerline of the vehicle. A portion of the inverter protection brace 22 load through the A-point bolt connections 56a, 56b contributes to deformation timing and shape of the front frame side members between the A-point bolt connections 56a, 56b and the B-point bolt connections 34a, 34b. The gusset 46 rotates below the front sub-frame 24 to delay loading of the inverter protection brace 22 and to delay bending of the front frame side members 50a, 50b to improve energy absorption of the front frame side members 50a, 50b during frontal impacts. On the rear end, the inverter protection brace 22 is attached by four bolts to the rear sub-frame 26 with an effective hinge portion 48 forward of the rear bolt connections. The bolted connection is connected to the rear sub-frame 26 at a location outboard of the centerline of the vehicle and inboard of the gusset 46 location. The gusset 46 connection is able to deform under the front sub-frame 24 to delay loading of the inverter protection brace 22. Loading from the inverter protection brace 22 travels through the rear sub-frame 26 to the A-point bolt connections 56a, 56b located on the pair of front side frame side members 50a, 50b. The timing of this load, dictated by the inverter protection brace 22 front attachment kinematics, affect the front side frame side members 56a, 56b bending between the A and B point bolt connections 56a, 56b, 34a, 34b. The rear sub-frame 26 deforms at the A-point bolt connections 56a, 56b. The inverter protection brace 22 deforms adjacent the bolted connection at the rear end to form the safety cage 20 around the inverter 12 during frontal impacts. The inverter protection brace 22 effectively creates the safety cage 20 around the inverter 12, as best seen in FIGS. 11A-11E during a frontal impact. Two configurations were studied for the inverter protection brace 22: a strong dual pipe structure; and a stamped structure with internal brace. The front attachment of the inverter protection brace 22 to the front sub-frame 24 is gusseted to provide a strong connection through a knuckle or a gusset that allows for translational motion under the front sub-frame 24 to delay front frame side member collapse behind the A-point bolt connections 56a, 56b. The inverter protection brace 22 has an elongate angled shape angling inboard with respect to a centerline of the vehicle adjacent a rear end. The inverter protection brace 22 has a generally concave arcuate shape from front to rear. This inverter protection brace 22 is able to transfer approximately two hundred kilo-Newton (kN) of force rearward until the rear sub-frame 26 attachment to the front side frame side members 50a, 50b fails and the rear sub-frame 26 is released from the side frame under-members 32a, 32b.

Replacement of the internal combustion engine with a much smaller electric motor removes the traditional load path through the firewall for frontal impact. Removal of this load path results in additional front side frame side members 50a, 50b deformation and rear sub-frame 26 motion which is directed toward the modules of the battery 16 in long range electric vehicles. These batteries 16 must be protected against rear sub-frame 26 attack. The addition of the ramps 28a, 28b to the vehicle side frame under-member 32a, 32b and/or rear sub-frame 26 prevents this damage by directing intruding structures beneath the batteries 16. The ramps 28a, 28b increase safe packaging volume allowing the inclusion of a higher volume of cells for the battery 16 in the vehicle. The higher volume of battery cells increases the range of an electric vehicle. The ramps 28a, 28b allows a margin of safety for even higher crash energies not included in government testing. The motor/transmission is attached to the rear sub-frame 26 of the vehicle. The rear sub-frame 26 is able to move rearward into the vehicle side frame under-members 32a, 32b and begin ramping down bolt-on ramps 28a, 28b. These ramps 28a, 28b have multiple interface angles to allow sliding of the rear sub-frame 26 and attached structures (steering gear 40, motor mount, bolts) down the angle and beneath the battery 16 for multiple frontal crash directions. The ramps 28a, 28b on the body cabin 18 are welded or bolted to the vehicle side frame under-member 32a, 32b. The ramps 28a, 28b are aligned with a chamfered surface 26a of the rear sub-frame 26 to allow sliding. The pitch angle of the ramps 28a, 28b is set such that crushing of the ramps 28a, 28b and the rear sub-frame 26 is accounted for in the ramping trajectory, such that attached structures of the rear sub-frame 26 passes below the battery structure. The bolt-on type ramps 28a, 28b are illustrated in FIGS. 1, 6, 7A-7E, 8A-8E, and 11A-11E which allows ramping on the interface shape. During some modes the ramps 28a, 28b are designed to act as the catching device 38 for the rear sub-frame 26 and attached structures to improve energy absorption (EA) response of the vehicle system.

Referring now to FIGS. 1, 3, 4A-4D, 5A-5D, 11A-11E and 13A-13B, removal of the internal combustion (IC) engine load path through the firewall results in more rear sub-frame 26 intrusion. In addition, the battery modules 16 require protection from the intruding rear sub-frame 26. Using a deflection technique for the rear sub-frame 26 results in a loss of energy absorption (EA) as the rear sub-frame 26 structure slides easily beneath the battery 16. This loss of energy absorption (EA) at the rear sub-frame 26 results in more side member deformation and increased load to the rocker. Both of which contribute to more intrusion to the body cabin 18 safety cage. The strong non-deformable ramps 28a, 28b allow easy separation of the B-point bolt connections 34a, 34b and sliding motion. Low energy absorption (EA) is realized, but good trajectory is accomplished. Locating the ramps 28a, 28b too close to the rear sub-frame 26 results in quick separation of the rear sub-frame 26 and an early loss of energy absorption (EA). Thus a space is created using the reinforcement bracket 30a, 30b positioned such that buckling of a bottom wall 52a of the side frame under-members 32a, 32b occurs between the B-point bolt connection 34a, b and a front edge 30i, 30j of the reinforcement brackets 30a, 30b, while a boundary strength of a rearward wall of the reinforcement pockets 36a, 36b is defined by an outboard reinforcing edge 30k, 30l of the bracket 30a, 30b. The pocket 36a, 36b is able to temporarily restrain the rear sub-frame 26 restoring a load path before slippage and energy absorption (EA) loss.

The reinforcement brackets 30a, 30b can serve a multi-purpose: i.e. an attachment point for the battery 16, an attachment point for the ramps 28a, 28b and acting as an energy absorption (EA) pocket 36a, 36b facilitator. Attaching the battery 16 and the ramps 28a, 28b to the reinforcement brackets 30a, 30b prevents relative movement between the two parts and provides a higher margin of safety. The reinforcement bracket 30a, 30b can be added to the vehicle side frame under-members 32a, 32b. The reinforcement brackets 30a, 30b can be welded to the pair of side frame under-members 32a, 32b at a location rearward and inboard of a B-point attachment 34a, 34b of the rear sub-frame 26 to the pair of side frame under-members 32a, 32b. The rear sub-frame 26 can have a section which overlaps with the side frame under-members 32a, 32b at the B-point bolt connections 34a, 34b as best seen in FIGS. 13A-13B. During impact, each B-point bolt connections 34a, 34b is loaded as the rear sub-frame 26 moves rearward (as illustrated in phantom lines for t=44, t=68, and t=78). The location of the reinforcement brackets 30a, 30b is such that buckling of the bottom wall 52a of the side frame under-members 32a, 32b starts to occur and the pocket 36a, 36b is formed providing good energy absorption (EA) as the side frame under-members 32a, 32b are deformed and the rear sub-frame 26 moves rearward. The reinforcement brackets 30a, 30b facilitates formation and controls a deformation shape of the energy absorption pocket 36a, 36b in the side frame under-member 32a, 32b forward of and outboard of the reinforcement bracket 30a, 30b during a frontal impact for temporarily restraining the rear sub-frame 26 prior to the rear sub-frame 26 being released from a B-point bolt connections 34a, 34b to the side frame under-members 32a, 32b and allowed to slide past the reinforcement bracket brackets 30a, 30b. After the pocket 36a, 36b fully deforms, then the pocket back wall (shape and position defined by the location of the bracket) 52b tears releasing the rear sub-frame 26 to slide past the reinforcement brackets 30a, 30b. As best seen in FIG. 13A, a position of the back wall 52b determines an initiation strength of the back wall 52a buckling for the pocket 36a, 36b formation. An angular position of the reinforcement outboard back wall 52b of the side frame under-member 32a, 32b determines a strength of the back wall 52b and the deformed shape of the energy absorption pockets 36a, 36b.

In this embodiment the battery 16 and the ramps 28a, 28b both attach to the reinforcement bracket 30a, 30b. The reinforcement brackets 30a, 30b defines an attachment for a battery 16 located rearward of the reinforcement brackets 30a, 30b, and an attachment for the ramps 28a, 28b connected to a bottom wall 30c, 30d of the reinforcement brackets 30a, 30b for directing rearward movement of the rear sub-frame 26 beneath the battery 16. This construction prevents relative motion between the two structures increasing robustness. The reinforcement brackets 30a, 30b includes a bottom wall 30c, 30d and a pair of upwardly extending sidewalls 30e, 30f, 30g, 30h on opposite sides of the bottom wall 30c, 30d, at least one sidewall 30e, 30g bending in an outboard direction at a forward end.

The reinforcement brackets 30a, 30b can be attached to the vehicle side frame under-members 32a, 32b by way of body welding. Both the ramps 28a, 28b and the battery 16 can be attached in such a way that relative motion between the two structures is not allowed. The reinforcement brackets 30a, 30b are positioned rearward on the side frame under-member 32a, 32b connection to the rear sub-frame 26, such that the rear sub-frame 26 can move rearward before creating the pockets 36a, 36b.

Figure 2:
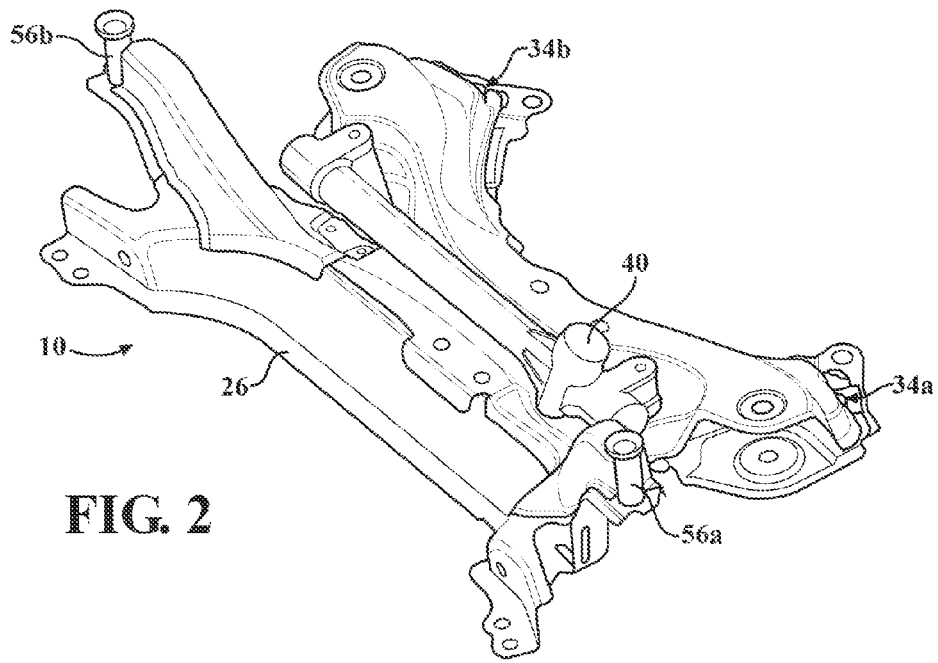
FIG. 2 is a perspective view of a top of the rear sub-frame with attached structure, such as a steering gear, and depicts an A-point bolt connection location and a B-point bolt connection location.
Figure 3:
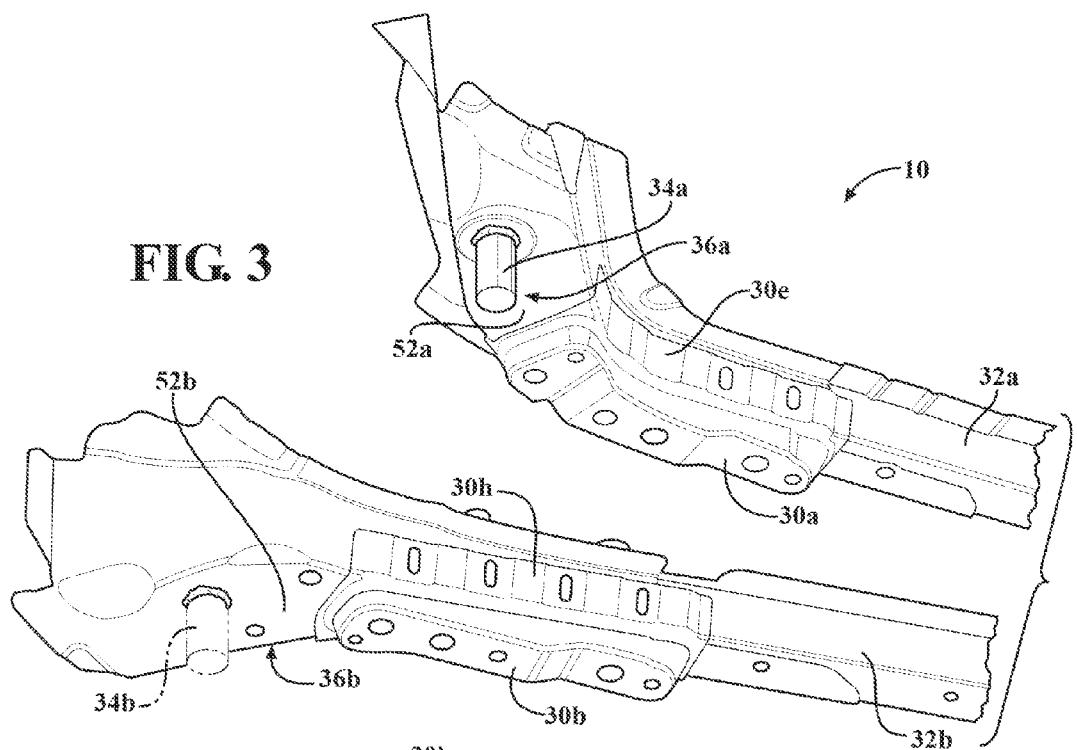
FIG. 3 is perspective view of a bottom of the pair of side frame under-members showing B-point bolt connection locations in phantom and reinforcement brackets attached to the pair of side frame under-members.
Figure 4A:
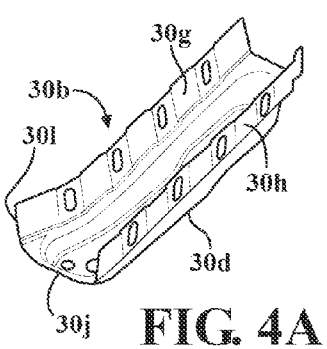
FIG. 4A is a perspective view of a passenger side reinforcement bracket.
Figure 4B:
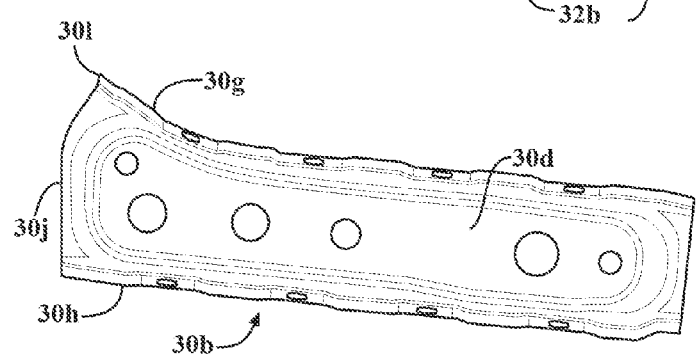
FIG. 4B is a bottom view of the passenger side reinforcement bracket of FIG. 4A.
Figure 4C:
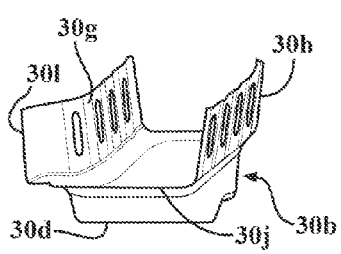
FIG. 4C is a front view of the passenger side reinforcement bracket of FIGS. 4A-4B.
Figure 4D:
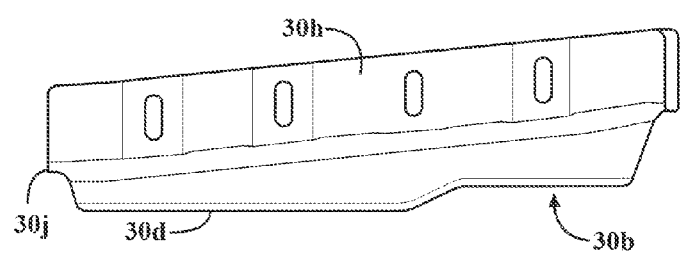
FIG. 4D is a side view of the passenger side reinforcement bracket of FIGS. 4A-4C.
Figure 5A:
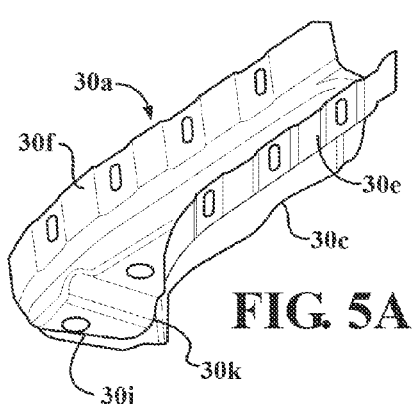
FIG. 5A is a perspective view of a driver side reinforcement bracket.
Figure 5B:
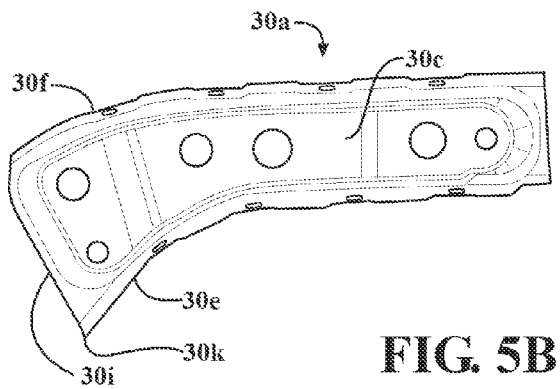
FIG. 5B is a bottom view of the driver side reinforcement bracket of FIG. 5A.
Figure 5C:
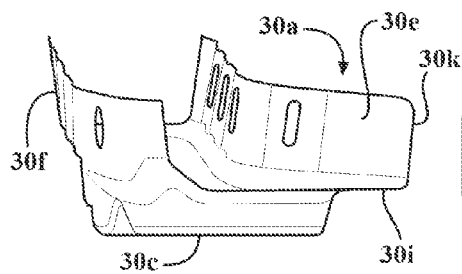
FIG. 5C is a front view of the driver side reinforcement bracket of FIGS. 5A-5B.
Figure 5D:
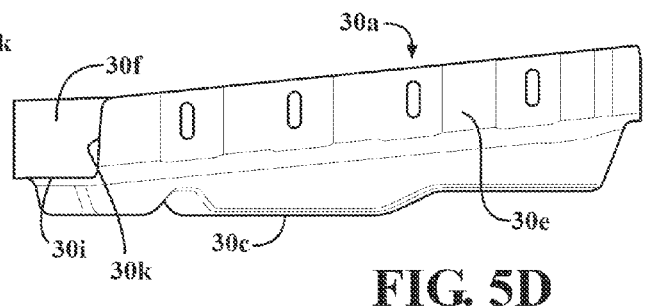
FIG. 5D is a side view of the driver side reinforcement bracket of FIGS. 5A-5C.
Figure 6:
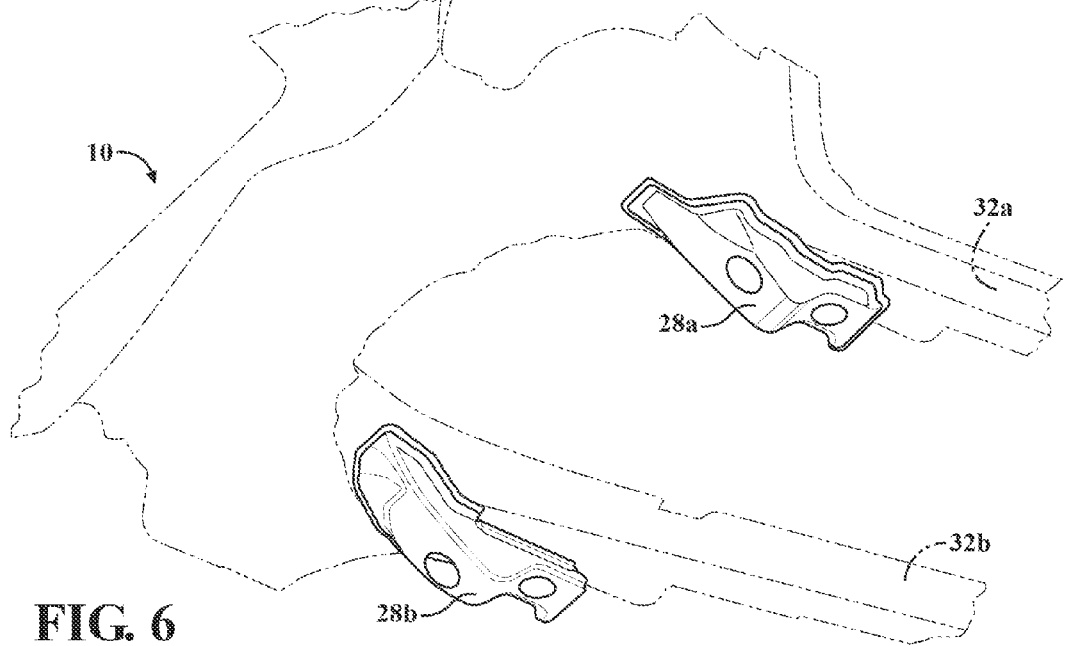
FIG. 6 is perspective view of a bottom of the pair of side frame under-members showing ramps attached to the reinforcement brackets.
Figure 7A:
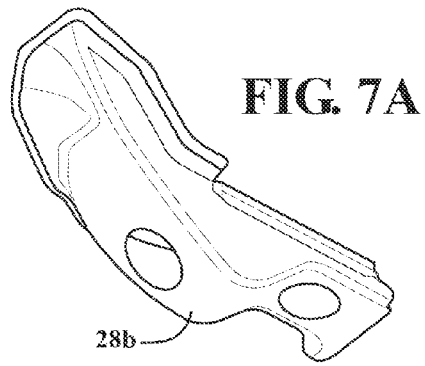
FIG. 7A is a perspective view of a passenger side ramp.
Figure 8A:
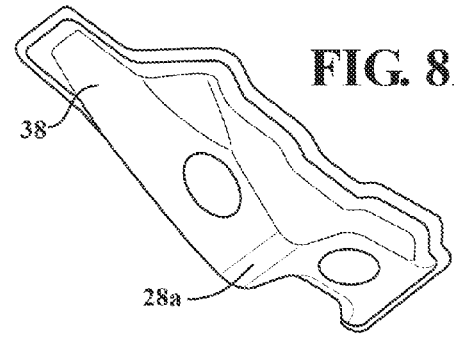
FIG. 8A is a perspective view of a driver side ramp.
Figure 7B:
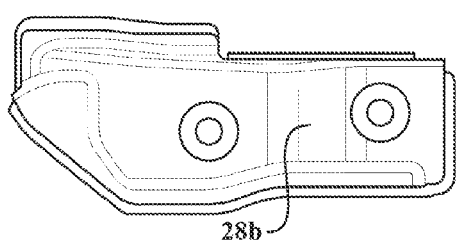
FIG. 7B is a bottom view of the passenger side ramp of FIG. 7A.
Figure 8B:
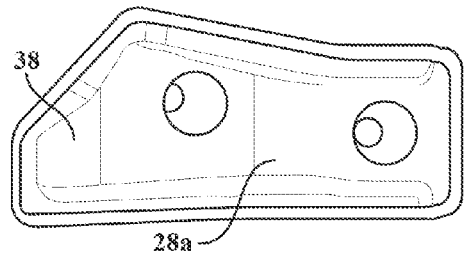
FIG. 8B is a bottom view of the driver side ramp of FIG. 8A.
Figure 7C:
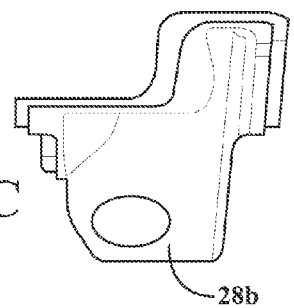
FIG. 7C is a front view of the passenger side ramp of FIGS. 7A-7B.
Figure 8C:
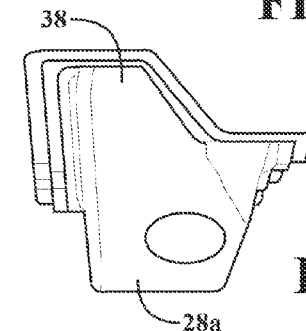
FIG. 8C is a front view of the driver side ramp of FIGS. 8A-8B.
Figure 7D:
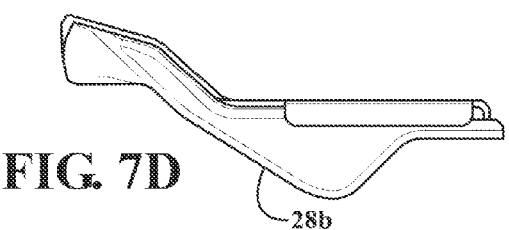
FIG. 7D is an inboard side view of the passenger side ramp of FIGS. 7A-7C.
Figure 8D:
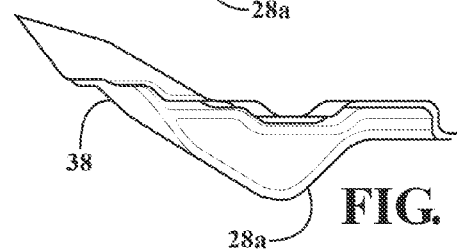
FIG. 8D is an outboard side view of the driver side ramp of FIGS. 8A-8C.
Figure 7E:
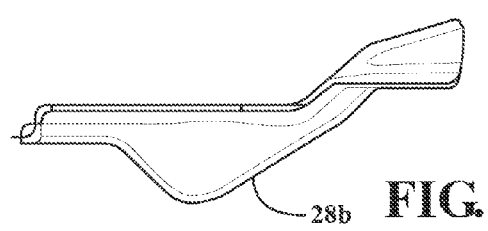
FIG. 7E is an outboard side view of the passenger side ramp of FIGS. 7A-7D.
Figure 8E:
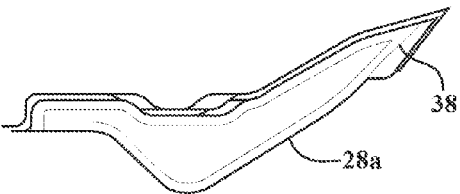
FIG. 8E is an inboard side view of the driver side ramp of FIGS. 8A-8D.
Figure 9A:
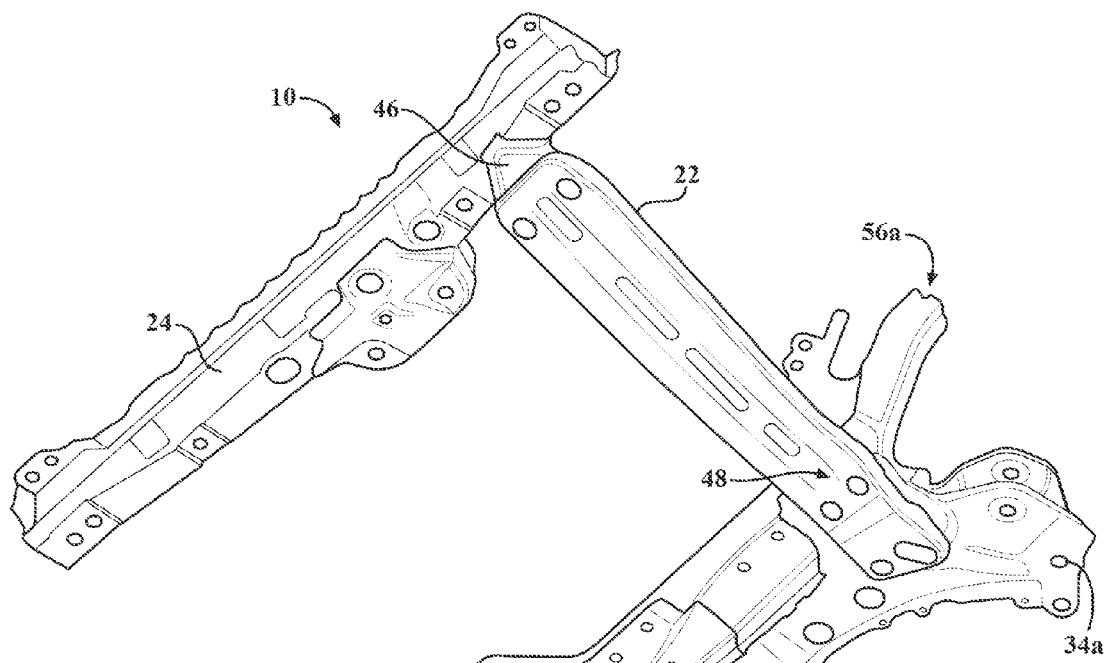
FIG. 9A is a perspective view of a bottom of the front and rear sub-frames showing the inverter protection brace connecting the front and rear sub-frames.
Figure 9B:
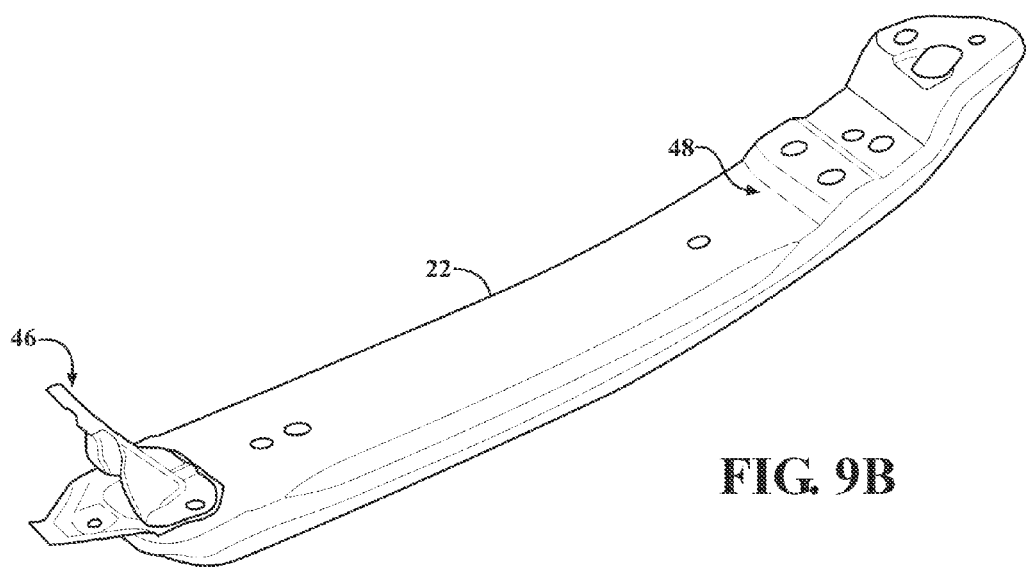
FIG. 9B is a perspective view of a top of the inverter protection brace of FIG. 9A showing a gusset on a front end and a bolted connection on a rear end.

Referring now to FIGS. 1-2, 6, 8A-8E, and 11A-11E, to reestablish a load path between the rear sub-frame 26 and the side frame under-members 32a, 32b after separation of the rear sub-frame 26 from the vehicle side frame under-members 32a, 32b occurs, the steering gear 40 mounted to top side of the rear sub-frame 26 as best seen in FIG. 2 is used as a load path to push against an underbody structure, such as the ramp 28a and/or the catching surface 38. The elimination of the internal combustion engine removed the traditional load path between the frontal impact barrier through the engine into the fire wall. This results in more side member deformation and more rear sub-frame 26 rearward stroke. In order to prevent battery 16 damage in long range electric vehicles (EV) and to prevent body cabin 18 deformation new load paths were explored. A frame structure system includes a deflection method to send the rear sub-frame 26 beneath the battery 16 that results in a substantial load drop once deflection of the rear sub-frame 26 by the ramps 28a, 28b occurs as overall interference between the rear sub-frame and vehicle frame is reduced. This load drop results in increased body cabin 18 deformation as the remaining energy must be absorbed by the remaining structure.

The catching surface 38 can be added to promote additional energy absorption through locking of the catching surface 38 with respect to the rear sub-frame 26, such that continued rearward motion of the locked catching surface 38 and the rear sub-frame 26 results in weld separation and crush of the side frame under-members 32a, 32b. By adding the catching surface 38 on the deflection ramps 28a, 28b, the rear sub-frame 26 is slowed and energy absorption occurs as the locked rear sub-frame 26 and the catching surface 38 requires additional crush and weld separation of the side frame under-members 32a, 32b as the temporarily locked structures move rearward helping to mitigate the effects of the deflection on the body cabin 18. The ramps 28a, 28b can be modified to include a standing flange or the catching surface 38 that is able to engage the steering gear 40 mounted on a top side of the rear sub-frame 26, as best seen in FIG. 2, and catch protruding features from the steering gear 40 housing. The flange or catching surface 38 on the ramps 28a, 28b is positioned in both the width and height position to provide good overlap with the intrusion locus of the rear sub-frame 26 for frontal impact modes (offset deformable barrier (ODB), frontal rigid barrier (FRB), left angle rigid barrier (LARB)). As the rear sub-frame 26 separates from the side frame under-members 32a, 32b, the rear sub-frame 26 moves rearward either crushing or sliding along the other under body components. As more sliding occurs, the reaction force drops and more body cabin 18 intrusion results. By catching the rear sub-frame 26 by interacting with the steering gear 40, motor mount, or additional structures the reaction load can be kept relatively high improving loading efficiency and limiting load transfer through the side member and toe-pan. An edge surface 28 of the ramps 28a, 28b is modified to capture the steering gear 40 as the rear sub-frame 26 moves backward toward the battery 16.

Referring now to FIGS. 1, 10A-10B, 11A-11E and 14A-14B, to maximize underbody energy absorption, the tether 44 is used to hold the rear sub-frame 26 against ramps 28a, 28b to improve crushing trajectory instead of allowing easy slide and loss of the load path. In addition this method increases the resulting normal force and resulting friction. The loss of energy absorption arises as a result of adding body ramps 28a, 28b. A very strong tether 44 could conceptually control rear sub-frame 26 motion from initial impact and force additional X direction energy absorption (EA) instead of allowing slip-off. Without a tether 44, reliance is placed on rear sub-frame 26 interaction with the underbody to keep contact. With a tether 44, more freedom for load angle is achieved which will allow better motion control. The tether 44 aids to keep all moving parts in contact while prescribing additional crushing deformation and increasing friction. The steel tether 44 modifies an existing noise-vibration (NV) and ride and handling brace to improve the loading direction of the rear sub-frame 26 against the underbody. The tether 44 is attached to the vehicle side frame under-members 32a, 32b at two outboard attachment locations 54*a*, 54*b* using a bolt and reinforced bearing surface. The tether 44 is then attached to the rear sub-frame 26 at two B-point inboard bolt connections 4*a*, 34*b*.

During frontal impact, the deformation of the rear sub-frame 26 rearward breaks the B-point bolt connections 34*a*, 34*b* from the side frame under-members 32*a*, 32*b*. As the rear sub-frame 26 starts to slide down the ramps 28*a*, 28*b*, the tether 44 holds the rear sub-frame 26 up requiring additional crushing of both the side frame under-member 32*a*, 32*b* and rear sub-frame 26 resulting in greater energy absorption. The tether 44 is able to provide an upward force against the rear sub-frame 26 as the rear sub-frame 26 begins to slide down the ramp 28*a*, 28*b*. This allows other energy absorption (EA) structures to perform more effectively. The tether 44 attaches at a rear portion of the rear sub-frame 26 and at outboard attachment locations 54*a*, 54*b* of a second pair of side frame under-members 32*a*, 32*b*.

As best seen in FIGS. 14A-14B, the tether 44 is able to rotate, i.e. arrows 90*a*, at the locations 54*a*, 54*b* of attachment to the side frame under-members 32*a*, 32*b*. The tether 44 is angled forward from the out-board attachment locations 54*a*, 54*b* such that rearward motion of the rear sub-frame 26 slackens the tether 44 to a point where the tether 44 has rotated to a position perpendicular to the vehicle axis. As the tether 44 rotates, there is a limited degree of displacement, i.e. some Z-axis displacement, i.e. see arrow 90*b*, in FIG. 14B that is allowed for the rear sub-frame 26. However, this Z-axis displacement is less than that demanded by the pitch set for the ramps 28*a*, 28*b* requiring additional crush of the rear sub-frame 26 and a resulting higher friction. In other words, the tether 44 slack from rotation is less than the increase in vertical displacement of the rear sub-frame 26 thereby requiring additional crush of the rear sub-frame 26 and contacting components before tether 44 separation. A combined trajectory path 92 of the rear sub-frame 26 along the ramps 28*a*, 28*b* restrained by the tether 44 extends through a progressively narrowing gap with decreasing clearance distances, where the clearance distances $D_0 > D_1 > D_2$. The progressively narrowing clearance gap requires additional crushing of the rear sub-frame 26 and resulting higher friction prior to separation of the tether 44.

Figure 11A:
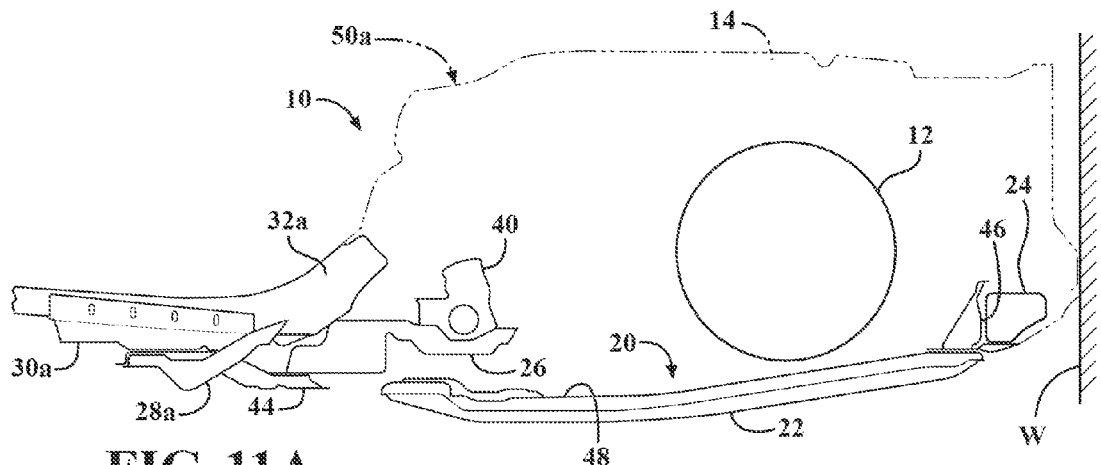
FIG. 11A is a simplified side view of front end of a motor vehicle illustrating an inverter, side frame under-member, inverter protection brace, reinforcement bracket, ramp, rear sub-frame, and steering gear at time zero prior to a frontal impact.
Figure 11B:
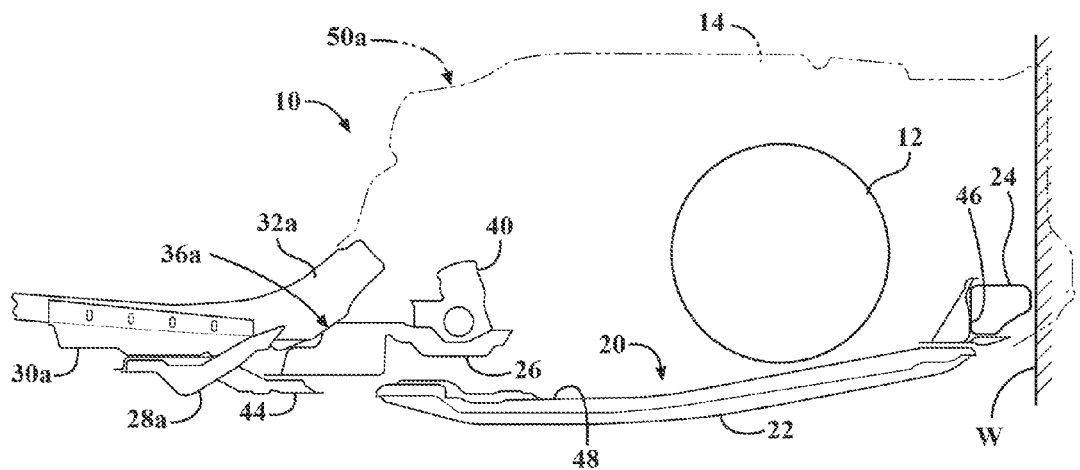
FIG. 11B is a simplified side view of front end of a motor vehicle illustrating an inverter, side frame under-member, inverter protection brace, reinforcement bracket, ramp, rear sub-frame, and steering gear at 44 milliseconds (ms) time after a frontal impact, where the inverter protection bracket hits a wall, the front sub-frame starts deformation, and a pocket starts to form.
Figure 11C:
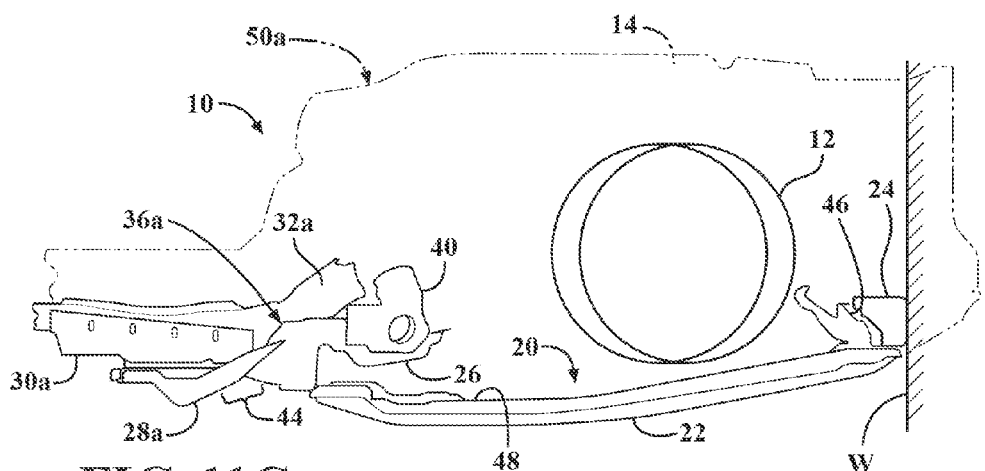
FIG. 11C is a simplified side view of front end of a motor vehicle illustrating an inverter, side frame under-member, inverter protection brace, reinforcement bracket, ramp, rear sub-frame, and steering gear at 68 milliseconds (ms) time after a frontal impact, where the rear sub-frame approaches the ramp, maximum front sub-frame crush occurs as the inverter protection brace rotates under the attachment knuckle and loads wall directly, back side of pocket releases B-point connection of rear sub-frame, tether loading begins, and ramp slide begins, where loading through the inverter protection brace and rear sub-frame A-points allows front frame side member to deform between the A and B points (not shown)
Figure 11D:
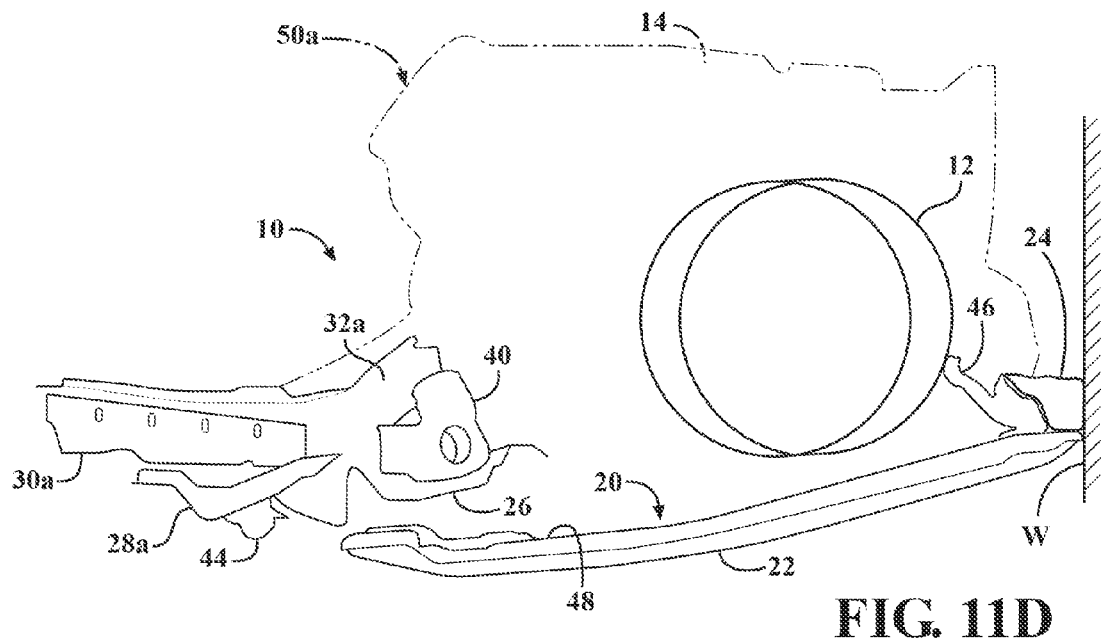
FIG. 11D is a simplified side view of front end of a motor vehicle illustrating an inverter, side frame under-member, inverter protection brace, reinforcement bracket, ramp, rear sub-frame, and steering gear at 76 milliseconds (ms) time after a frontal impact, where tether releases, rear sub-frame is crushed to maximum amount, and ramp slide picks up, and the rear sub-frame detaches from the front frame side member at the time of tether separation.
Figure 11E:
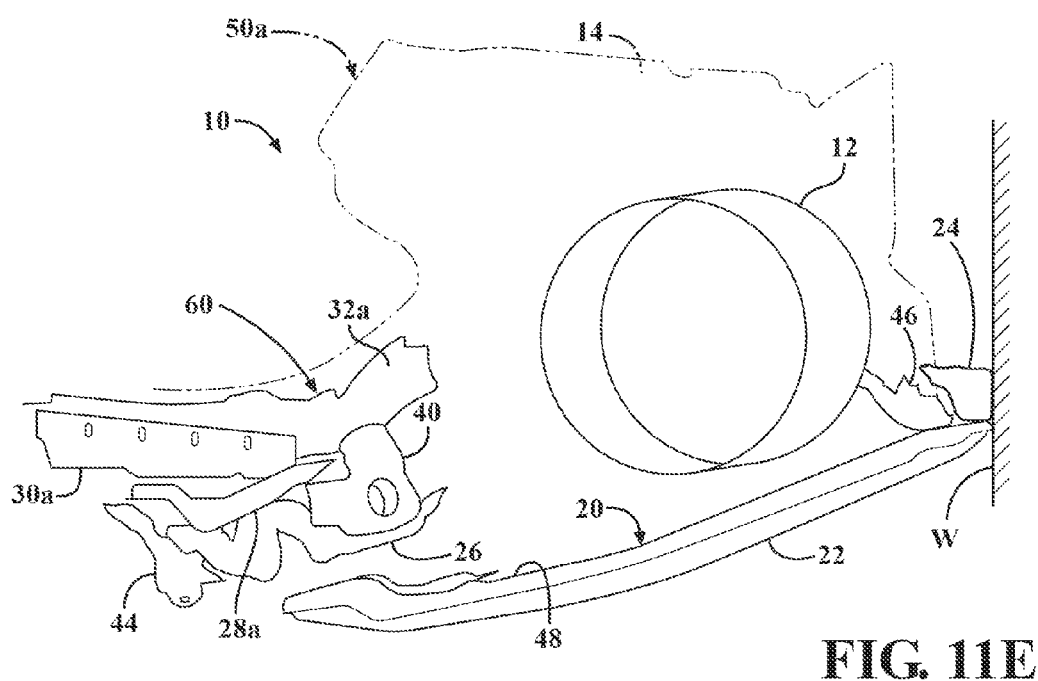
FIG. 11E is a simplified side view of front end of a motor vehicle illustrating an inverter, side frame under-member, inverter protection brace, reinforcement bracket, ramp, rear sub-frame, and steering gear at 100 milliseconds (ms) time after a frontal impact, where loading of steering gear starts, ramp slide approaches maximum, additional load through ramp initiates under-member weld separation, and inverter shows minimal damage.

Referring now to FIGS. 11A-11E, these simplified images are for IIHS, 35 mph, 40% offset-deformable-barrier, test mode. Referring to FIG. 11A, a simplified side view of a front end of a motor vehicle illustrates the inverter 12, the side frame under-members 32*a*, 32*b*, the inverter protection brace 22, the reinforcement brackets 30*a*, 30*b*, the ramps 28*a*, 28*b*, the rear sub-frame 26, the front sub-frame 24, and the steering gear 40 at time zero prior to a frontal impact with a barrier wall W. In FIG. 11B, the inverter 12, the side frame under-members 32*a*, 32*b*, the inverter protection brace 22, the reinforcement brackets 30*a*, 30*b*, the ramps 28*a*, 28*b*, the rear sub-frame 26, and the steering gear 40 are depicted at 44 milliseconds (ms) of time after a frontal impact. The inverter protection brace 22 hits a wall, the front sub-frame 24 starts deformation as the front attachment gusset 46 rotates under the front sub-frame 24, and the energy absorption pockets 36*a*, 36*b* start to form as the rear sub-frame 26 is pushed rearward by the inverter protection brace 22 and initial bending of the front frame side-members 50*a*, 50*b* between the A and B point bolt connections 56*a*, 56*b*, 34*a*, 34*b*. FIG. 11C illustrates the inverter 12, the side frame under-members 32*a*, 32*b*, the inverter protection brace 22, the reinforcement brackets 30*a*, 30*b*, the ramps 28*a*, 28*b*, the rear sub-frame 26, and the steering gear 40 at 68 milliseconds (ms) of time after a frontal impact. The rear sub-frame 26 approaches the ramp 28*a*, 28*b*, maximum front sub-frame 24 crush occurs as the inverter protection brace 22 loads the wall directly, the front frame side member 50*a*, 50*b* bends rearward of the A-point bolt connections 56*a*, 56*b*, a back side of pocket 36*a*, 36*b* releases the B-point connections 34*a*, 34*b* of rear sub-frame 26, tether 44 loading begins, and rear sub-frame 26 slide along the ramps 28*a*, 28*b* begins. In FIG. 11D, the inverter 12, the side frame under-members 32*a*, 32*b*, the inverter protection brace 22, the reinforcement brackets 30*a*, 30*b*, the ramps 28*a*, 28*b*, rear sub-frame 26, and the steering gear 40 are depicted at 76 milliseconds (ms) of time after a frontal impact. The tether 44 releases, rear sub-frame 26 is crushed to a maximum amount, and the rear sub-frame 26 slide along the ramps 28*a*, 28*b* picks up as additional front frame side member 50*a*, 50*b* deformation occurs. FIG. 11E illustrates the inverter 12, the side frame under-members 32*a*, 32*b*, the inverter protection brace 22, the reinforcement brackets 30*a*, 30*b*, the ramps 28*a*, 28*b*, the rear sub-frame 26, and the steering gear 40 at 100 milliseconds (ms) of time after a frontal impact. Loading of the steering gear 40 starts, the rear sub-frame slide along ramps 28*a*, 28*b* approaches maximum, additional load through the ramps 28*a*, 28*b* initiates the side frame under-members 32*a*, 32*b* weld separation in area 60, and the inverter 12 shows minimal damage.

Figure 12:
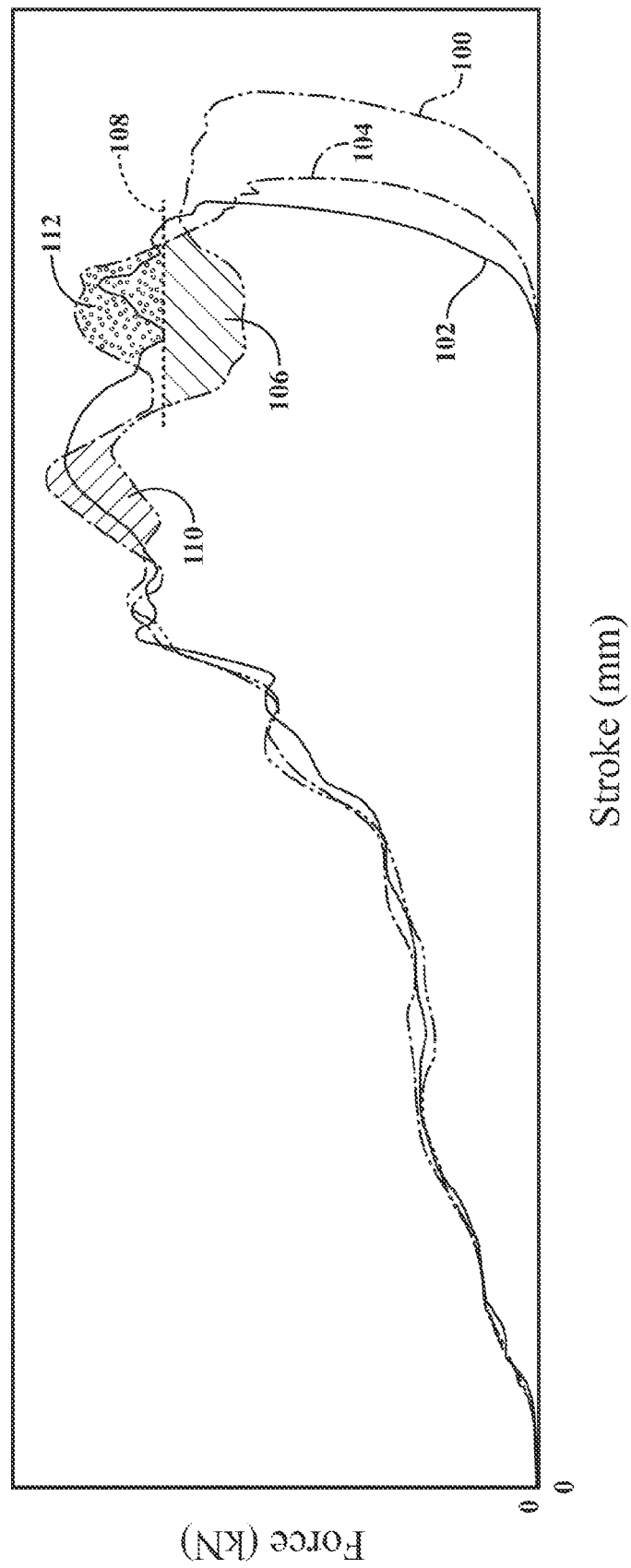
FIG. 12 is a simplified graph showing an approximated IIHS ODB response force in kiloNewton (kN) versus stroke in millimeter (mm), where the double dashed line illustrates a strongly connected inverter protection brace to the front sub-frame (no rotation at knuckle resulting in early collapse of the front frame side member behind the A-point), a hard ramp with slide (i.e. easily separating B-point bolt connection), the solid line illustrates a strong yet deformable attachment for the inverter protection brace (delays front frame side member collapse), a reinforcement bracket forming an energy absorption pocket in the side frame under-member in combination with a ramp and a steering gear catcher, and the single dashed line illustrates a high massed initial vehicle with a strong yet deformable attachment for the inverter protection brace, a reinforcement bracket forming an energy absorption pocket in the side frame under-member in combination with a ramp, a steering gear catcher and a tether.

In the force versus stroke curves of FIG. 12, the double dashed line 100 shows the combination of the semi-strong front attachment inverter protection brace 22 and the ramps 28*a*, 28*b* welded directly to a frame under-member providing a condition where ramping occurs early with easily separating B-point bolt connection 34*a*, 34*b* of the rear sub-frame 26 from the side frame under-member 32*a*, 32*b*. Load from the inverter protection brace 22 is transferred through the A-point bolt connections 56*a*, *b* and causes early front frame side members 50*a*, *b* collapse and EA loss shown by the lower bound of the cross hatching 110. A large drop in energy absorption (EA) occurs shown by the lower boundary of the dashed horizontal line 108 due to easy slide. The solid line 102 illustrates the combination of the deformable front attachment inverter protection brace 22, the bolted ramps 28*a*, 28*b*, the reinforcement brackets 30*a*, 30*b* providing a case with formation of the energy absorption pockets 36*a*, 36*b* in the side frame under-members 32*a*, 32*b* providing a large additional energy absorption (EA) area shown in cross hatching 106 below the dashed horizontal line 108. The side frame under-member 32*a*, 32*b* deform to create the energy absorption pockets 36*a*, 36*b* and subsequent tearing of the rear sub-frame 26 from the side frame under-members 32*a*, 32*b*. The cross hatching 110 shows the improvement in early EA from delaying loading through the inverter protection brace 22 by having a deformable front attachment allowing rotation of the brace under the front sub-frame. The single dashed line 104 shows a high vehicle mass result with the combination of the deformable front attachment inverter protection brace 22, the reinforcement brackets 30*a*, 30*b* forming the energy absorption pockets 36*a*, 36*b* in the side frame under-members 32*a*, 32*b*, the ramps 28*a*, 28*b*, the steering gear 38, and the tether 44. The cross hatching 110 shows the improvement in early EA from delaying loading (and therefore delayed front side frame side members 50*a*, 50*b* collapse) through the inverter protection brace 22 by having a deformable front attachment allowing rotation of the inverter protection brace 22 under the front sub-frame 24. The cross hatched area 106 corresponds to the additional energy absorption from initiation of the energy absorption pocket pockets 36*a*, 36*b* in the side frame under-members 32*a*, 32*b* by the reinforcement bracket 30*a*, 30*b*. The stippled area 112 corresponds to the additional energy absorption attributable to the catching surface 38 interacting with the steering gear 40 while supported in prolonged crushing contact with the ramps 28a, 28b by the tether 44.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A frame structure for a land vehicle having wheels to engage a surface over which the vehicle moves, an electric motor enabling the vehicle to be moved along the surface, the frame structure providing support for a vehicle body, where at least a portion of the frame structure changes shape in response to impact of the frame structure with another body, the frame structure adapted to absorb energy from frontal impacts, the frame structure extending under a front portion of the vehicle body, the frame structure comprising:
a front sub-frame and a rear sub-frame located below and in front of a pair of side frame under-members; and
an inverter protection brace extending between the front sub-frame and the rear sub-frame for transferring energy from the front sub-frame to the rear sub-frame during a frontal impact.

2. The frame structure of claim 1 further comprising:
a gusset at a front end of the inverter protection brace for connecting the front sub-frame to load a beam section without overloading attaching bolts.

3. The frame structure of claim 1 further comprising:
a bolted connection at a rear end of the inverter protection brace to the rear sub-frame.

4. The frame structure of claim 1 further comprising:
A-point bolt connections of the rear sub-frame to a pair of front frame side members located above the rear sub-frame; and
B-point bolt connections of the rear sub-frame to the pair of side frame under-members, wherein loading from the inverter protection brace travels through the rear sub-frame to the A-point bolt connections located on the pair of front frame side members, the rear sub-frame moves rearward and deforms at the A-point bolt connections, at least one of the pair of side frame under-members buckles rearward of the B-point bolt connections for energy absorption during the frontal impact.

5. The frame structure of claim 4, wherein a portion of the inverter protection brace load through the A-point bolt connections contributes to deformation timing and shape of the front frame side members between the A-point bolt connections and the B-point bolt connections.

6. The frame structure of claim 4 further comprising:
a gusset at a front end of the inverter protection brace for connecting the front sub-frame to load a beam section without overloading attaching bolts, wherein the gusset rotates below the front sub-frame to delay loading of the inverter protection brace and to delay bending of the front frame side members to improve energy absorption of the front frame side members during frontal impacts.

7. The frame structure of claim 1, wherein the inverter protection brace deforms adjacent a bolted connection at a rear end to form a safety cage around an inverter during the frontal impact.

8. The frame structure of claim 1 further comprising:
a gusset at a front end of the inverter protection brace connecting to the front sub-frame to load a beam section without overloading attaching bolts, the gusset connected to the front sub-frame at a location outboard from a centerline of the vehicle; and
a bolted connection at a rear end of the inverter protection brace attaching to the rear sub-frame, the bolted connection connected to the rear sub-frame at a location outboard of the centerline of the vehicle and inboard of the gusset location.

9. The frame structure of claim 1 further comprising:
the inverter protection brace having an elongate angled shape angling inboard with respect to a centerline of the vehicle adjacent a rear end.

10. The of claim 1 further comprising:
the inverter protection brace having a generally concave arcuate shape from front to rear.

11. A method of assembling structural members for absorbing energy from frontal impacts of a frame structure for a land vehicle having wheels to engage a surface over which the vehicle moves, an electric motor enabling the vehicle to be moved along the surface, the frame structure providing support for a vehicle body, where the frame structure changes shape in response to impact of the frame structure with another body, the frame structure extending under a front portion of the vehicle body, the method comprising:
locating a front sub-frame and a rear sub-frame below and in front of a pair of side frame under-members; and
connecting an inverter protection brace extending between the front sub-frame and the rear sub-frame for transferring energy during a frontal impact.

12. The method of claim 11 further comprising:
connecting a gusset at a front end of the inverter protection brace to the front sub-frame to load a beam section without overloading attachment bolts.

13. The method of claim 11 further comprising:
bolting the inverter protection brace at a rear end to the rear sub-frame.

14. The method of claim 11 further comprising:
connecting the rear sub-frame to a pair of front frame side members located above the rear sub-frame at A-point bolt connections; and
connecting the rear sub-frame to the pair of side frame under-members at B-point bolt connections, wherein loading from the inverter protection brace travels through the rear sub-frame to the A-point bolt connections located on the pair of front frame side members, the rear sub-frame moves rearward and deforms at the A-point bolt connections, at least one of the pair of side frame under-members buckles rearward of the B-point bolt connections for energy absorption during the frontal impact.

15. The method of claim 14 further comprising:
loading a portion of the inverter protection brace through the A-point bolt connections to contribute to deformation timing and shape of the front frame side members between the A-point bolt connections and the B-point bolt connections.

16. The method of claim 14 further comprising:
connecting a gusset at a front end of the inverter protection brace to the front sub-frame to load a beam section without overloading attachment bolts; and
rotating the gusset below the front sub-frame to delay loading of the inverter protection brace and delay bending of the front frame side members to improve energy absorption of the front frame side members during frontal impacts.

17. The method of claim 11 further comprising:
deforming the inverter protection brace adjacent a bolted connection at a rear end to form a safety cage around an inverter during the frontal impact.

18. The method of claim 11 further comprising:
connecting the inverter protection brace to the front sub-frame with a gusset at a front end to load a beam section without overloading attaching bolts, the gusset connected to the front sub-frame at a location outboard from a centerline of the vehicle; and
connecting the inverter protection brace to the rear sub-frame with a bolted connection at a rear end, the bolted connection connected to the rear sub-frame at a location outboard of the centerline of the vehicle and inboard of the gusset location.

19. The method of claim 11 further comprising:
providing the inverter protection brace with an elongate angled shape; and
angling the inverter protection brace inboard with respect to a centerline of the vehicle adjacent a rear end.

20. The method of claim 11 further comprising:
providing the inverter protection brace with a generally concave arcuate shape from front to rear.

21. A frame structure adapted to absorb energy from frontal impacts, the frame structure extending under a front portion of a vehicle body, the frame structure comprising:
a front sub-frame and a rear sub-frame located below and in front of a pair of side frame under-members; and
an inverter protection brace extending between the front sub-frame and the rear sub-frame for transferring energy from the front sub-frame to the rear sub-frame during a frontal impact.

22. The frame structure of claim 21 further comprising:
a gusset at a front end of the inverter protection brace connecting to the front sub-frame to load a beam section without overloading attaching bolts; and
a bolted connection at a rear end of the inverter protection brace to the rear sub-frame.

23. The frame structure of claim 21 further comprising:
A-point bolt connections of the rear sub-frame to a pair of front frame side members located above the rear sub-frame; and
B-point bolt connections of the rear sub-frame to the pair of side frame under-members, wherein loading from the inverter protection brace travels through the rear sub-frame to the A-point bolt connections located on the pair of front frame side members, the rear sub-frame moves rearward and deforms at the A-point bolt connections, at least one of the pair of side frame under-members buckles rearward of the B-point bolt connections for energy absorption during the frontal impact.

24. The frame structure of claim 23, wherein a portion of the inverter protection brace load through the A-point bolt connections contributes to deformation timing and shape of the front frame side members between the A-point bolt connections and the B-point bolt connections.

25. The frame structure of claim 23 further comprising:
a gusset at a front end of the inverter protection brace connecting to the front sub-frame to load a beam section without overloading attaching bolts, wherein the gusset rotates below the front sub-frame to delay loading of the inverter protection brace and delay bending of the front frame side members to improve energy absorption of the front frame side members during frontal impacts.

26. The frame structure of claim 21, wherein the inverter protection brace deforms adjacent a bolted connection at a rear end to form a safety cage around an inverter during the frontal impact.

* * * * *

UNITED STATES PATENT AND TRADEMARK OFFICE
CERTIFICATE OF CORRECTION

PATENT NO. : 8,540,259 B1  
APPLICATION NO. : 13/445145  
DATED : September 24, 2013  
INVENTOR(S) : Jonathan Richard Young et al.

It is certified that error appears in the above-identified patent and that said Letters Patent is hereby corrected as shown below:

In the Specification  
In Column 5, line 32, please delete "56a, 56b" and insert -- 34a, 34b --.  
In Column 7, line 38, please delete "56a, 56b" and insert -- 50a, 50b --.  
In Column 11, line 3, please delete "4a" and insert -- 34a --.  
In Column 12, line 33, please delete "56a, b" and insert -- 56a, 56b --.  
In Column 12, line 34, please delete "50a, b" and insert -- 50a, 50b --.

Signed and Sealed this  
Third Day of December, 2013

Margaret A. Focarino  
*Commissioner for Patents of the United States Patent and Trademark Office*